United States Patent Office 3,730,750
Patented May 1, 1973

3,730,750
ISOLATION OF FINELY DIVIDED DYES FROM LIQUID DISPERSIONS
Wolfgang Fabian, Heidelberg, Germany, assignor to Badische Anilin- & Soda-Fabrik Aktiengesellschaft, Ludwigshafen am Rhine, Germany
No Drawing. Filed Mar. 15, 1971, Ser. No. 124,482
Claims priority, application Germany, Mar. 23, 1970, P 20 13 818.5
Int. Cl. C08h 17/14
U.S. Cl. 106—309    10 Claims

ABSTRACT OF THE DISCLOSURE

Process for the isolation of finely divided dyes, particularly those having valuable tinctorial properties. According to the process a dispersion of a dye in a liquid mixture of organic water-immiscible solvent having a melting point between $-20°$ and $+120°$ C. and water (the mixture may not contain a greater weight of water than of dye) is solidified by crystallization, and the solvent is then removed by sublimation.

---

It is well known that the synthesis of dyes and in particular of organic pigments often gives the dyes in a form in which they are unless for practical purposes because the primary particles are either too large or adhere to each other to form aggregates and agglomerates. Thus it is usually necessary to comminute crude pigments by milling or dissolution and reprecipitation. Fine and energy-rich particles tend to agglomerate and such agglomeration impairs the tinctorial characteristics of the dye to a considerably extent. For this reason, the crude dye is subjected to a recrystallizing treatment involving, for example, contact with organic solvents, and this treatment converts the crude dye to a form having highly satisfactory tinctorial strength. Processes of the kind, which are referred to, for example, as finishing treatments, are revealed for example in German Pat. 1,242,179 and U.S. Pat. 2,857,400.

The known finishing treatments suffer from the drawback that the high tinctorial quality of the dye is lost, at least to some extent, when the dye is isolated from the mixture. This undesirable reduction of quality occurs particularly at the end of the treatment, for example during drying of the aqueous filter cake which has been freed from organic solvent by steam distillation or a washing treatment.

In many cases, however, the finely divided state, which is so advantageous for dyeing applications, is impaired to some extent at an earlier stage. In particular, steam distillation may irreversibly damage the dye such that it suffers a loss of tinctorial strength, purity, particle softness and dispersibility. As the size of the batch increases, the residence times are necessarily longer and the abovementioned detrimental effects become more pronounced and can hardly be avoided, particularly with finishing treatments where water-immiscible organic solvents having boiling points of 100° C. or above have to be removed.

If, instead, the water-immiscible organic solvent is washed out during filtration, this is a troublesome and time-consuming procedure, since repeated rinsing or even mixing with a further, water-miscible solvent such as methanol is necessary. Finally, the said water-soluble organic solvent must be rinsed out with water. If the organic solvent is not removed completely or if the filter cake containing organic solvent is dried directly, the particles of dye adhere together to hard lumps causing a loss of tinctorial strength, brilliance and particle softness.

I have now found that finely divided dyes, particularly those having tinctorially valuable particle characteristics, may be isolated from dispersions of the dye in liquids without the aforementioned drawbacks, when a dispersion of the dye in a liquid mixture consisting of an organic solvent capable of evaporating without decomposing and having a melting point between $-20°$ and $+120°$ C. and water, the weight of organic solvent in the organic phase of said mixture being at least 0.3 times the weight of dye whilst the weight of water is the same as or less than the weight of dye present in the dispersion, is caused to solidify by crystallization, the aqueous phase present in the dispersion being removed, if desired, before or after crystallization of the solvent, and the solvent is removed from the solid mixture by sublimation.

The new process is applicable to all finely divided dyes capable of forming dispersions in the mixture of said organic solvents and water, i.e. no or no substantial dissolution of the dyes may take place in the liquid mixture. Examples of such dyes are vat dyes and particularly organic pigments such as those of the phthalocyanine, anthraquinone, azo, quinacridone and perylene tetracarboxylic acid series.

Suitable water-immiscible organic solvents capable of evaporating without decomposing and having a melting point between $-20°$ and $+120°$ C. are, in particular, those having a heat of vaporization of less than 200 kcal./kg. and a melting point between 5° and 100° C. As examples there may be mentioned ethylene bromide, benzene, p-dichlorobenzene, bromoform, 4-bormotoluene, t-butylcarbinol, dimethyl succinate, nitrobenzene, 4-chlorotoluene, cyclohexane, cyclohexanol, cyclohexanone, methyl-t-butylcarbinol, 1-methylcyclohexanol, naphthalene, pentamethyl alcohol, $\beta,\beta,\beta$-tdichloroethyl alcohol, $\beta,\beta,\beta$-trichloro-p-butyl alcohol and p-xylene.

Of these solvents ethylene bromide, benzene, dimethyl succinate, cyclohexane, cyclohexanone, p-dichlorobenzene, p-xylene and naphthalene are of particular interest commercially.

The lower limit of the total amount of solvent and water, based on the dye present in the dispersion, is set by the requirement that the dispersion must be stirable at temperatures above the melting point of the solvent. Conveniently, the weight of solvent is from 0.3 to 10 times the weight of the dye present in the dispersion.

Since the new process enables dyes having tinctorially valuable particle characteristics providing, for example, high tinctorial strength and ready dispersibility, to be isolated without loss of these valuable properties, it is preferred to apply the new process to dispersions of organic dyes which have been converted to a pigmentary form by conventional finishing methods.

According to one convenient embodiment of the new process the dye is isolated from the same organic solvents of the types mentioned above as those in which the crude dye was converted to the tinctorially valuable form in the presence of water in preceding finishing treatment. Such dispersions are obtained, for example, by treating the finely divided crude dye, which may have been milled to a finely divided state, with the said solvents at temperatures of up to 150° C. in the presence of water and, if necessary, in the presence of basifying and acidifying agents, the treatment being effected, conveniently with stirring, for from 1 to 20 hours for example, and separating the organic phase which settles from the aqueous phase after this treatment and which contains the dye, the organic solvent and residual water and which may be washed with water before final separation. To this end, it is convenient to start from the aqueous filter cake containing crude dye. In this finishing treatment preceding the isolating treatment the weight of water present is from 0.3 to 10 times and the weight of solvent is also from 0.3 to 10 times the weight of dye present. Examples of basifying agents are sodium hydroxide, potassium hydroxide and sodium carbonate. Acidifying agents are, for example, sulfuric acid and hydrochloric acid. They are used in the finishing mixture conveniently in proportions ranging from 0.1 to 10% by weight based on the dye.

According to the process of the invention for isolating the dye, the dispersion of dye is first of all solidified by crystallization. This may be effected, for example, by cooling the liquid dyestuff dispersion to temperatures below the melting point of the organic solvent until crystallization of the organic solvent is complete. The finely divided dye is then enveloped by fine crystals of solvent and thus fixed in position. Vacuum is then applied and the organic solvent is removed quantitatively by sublimation into a cooled receiver. The pressure is adjusted so as to be lower than the vapor pressure of the organic solvent at its melting point. The dry material then automatically assumes a temperature which is below the melting point of the organic solvent.

If my new process is carried out using dyestuff dispersions containing an excess of organic solvent such as an excess of from 3 to 10 times over the weight of dye present, it is not usually necessary to cool the mixture right down to the melting point of the organic solvent, because, when the vacuum is applied, a portion of the organic solvent rapidly evaporates from the liquid phase and this causes the mixture to cool adiabatically due to the removal of the necessary heat of vaporization, until the mixture eventually crystallizes solid spontaneously. The major portion of the organic solvent is then removed by sublimation from the solid phase as described above.

Alternatively, the organic solvent may be removed from the solid mixture by sublimation at ordinary pressure by air-drying the mixture at a temperature below the melting point of the solvent or by passing a stream of gas over the surface of the solid mixture, conveniently using a gas of poor heat-transfer properties such as air or nitrogen, at a temperature which is at or slightly above the melting point of the organic solvent. The solvent may be recovered by compressing the solvent-laden carrier gas.

My new process may be carried out, for example, in the same vessels as those used for the preceding finishing treatment of the dye. Alternatively, and particularly when large quantities are involved, the liquid dyestuff dispersion may be transferred to a substrate showing, advantageously, good heat conductivity and a large surface area, such as metal sheeting, such that the dispersion forms a thin layer on the substrate and the removal of the organic solvent may then be carried out by sublimation, for example in a vacuum drying cabinet.

By selecting suitable organic solvents, isolation of the dye may be effected by the process of the invention at temperatures above 0° C. In this respect it is superior to the process disclosed in German published application DAS 1,059,876 involving freeze-drying. It is also superior to that process in its greater ease of manipulation on a commercial scale and in its higher spacetime yields.

My new process produces dry finely divided powders having excellent tinctorial properties. The organic pigments isolated by this process are characterized by high tinctorial strength, high purity, excellent powder softness and very ready dispersibility.

EXAMPLE 1

A dyestuff dispersion, prepared as described in the following paragraph, is spread onto a metallic drying plate, which is then placed in a suction drying cabinet which is connected to the vacuum pump via a receiver cooled with Dry Ice. In the drying cabinet the dispersion is subjected to a vacuum of from 1 to 50 mm. of Hg. The mixture of p-xylene and water thus sublimates and the temperature automatically adjusts itself to a value between −20° and +5° C. depending on the vacuum applied and apparatus factors. The mixture is left in the drying cabinet until its temperature has again reached room temperature and a sample of the dye is odorless. Drying of the dye may be accelerated, if desired, by passing a weak stream of nitrogen or air through the drying cabinet and causing water at temperature of from 15° to 20° C. to flow slowly through the trays of the drying cabinet. At the end of this treatment the final traces of p-xylene may be removed by gradually raising the temperature of the water to 80° C. The polycholor-copperphthalocyanine is obtained in the form of a loose powder having a deep green color. The pigment requires no further milling and is superior to, say, the polychloro-copperphthalocyanines treated by the methods described in German Pat. 1,242,180 and German published application DAS 1,114,462, particularly in its particle softness and its dispersibility.

450 parts of an aqueous filter cake containing 30% of the crude polychloro-copperphthalocyanine produced according to Example 10 of German Pat. 717,164, are heated in a pressure vessel with from 75 to 450 parts of p-xylene having a melting point of 13° C., from 50 to 250 parts of water and 15 parts of 50% aqueous sodium hydroxide under autogenous pressure (about 2.5 atm. gage) with stirring at 120° to 140° C. for 5 hours. The hydrophobic polychloro-copperphthalocyanine is thus completely absorbed and enveloped by the p-xylene. There is thus produced an organic two-phase mixture which consists of pigment and solvent and which is deposited on the walls and bottom of the vessel, and a supernatant aqueous alkaline phase. The mixture is cooled to 50° C. with stirring. At 13° C. the p-xylene begins to crystallize, the pigment remaining embedded therein. Constant stirring causes the fully crystallized organic mixture to be slurried in the aqueous medium so that eventually a readily flowable suspension is obtained. This suspension is suction filtered in a box-type filter, washed with water at 0–10° C. until neutral and then pressed off. The filter cake contains, in addition to the mixture of pigment and crystallized p-xylene, from 5 to 30% of water in the form of small drops resting loosely on the surface.

If a filter cake is used which contains dye consisting of crude polybromo-polychloro-copperphthalocyanine as manufactured according to Example 12 of German Pat. 717,164 and the remaining treatment is carried out as described above, a pure pigment is obtained having equally good properties of particle softness, ready dispersibility and tinctorial strength.

EXAMPLE 2

Example 1 is repeated except that the dyestuff dispersion which is placed on the drying plate, solidified by crystallization and dried, is one prepared as described in the following paragraph. There is thus obtained a polychloro-copperphthalocyanine having excellent pigment properties.

450 parts of an aqueous filter cake containing 30% of the crude polychloro-copperphthalocyanine prepared according to Example 10 of German Pat. 717,164 are heated in a pressure vessel with from 150 to 1,500 parts of p-xylene under autogenous pressure (about 2.5 atm. gage) at from 110° to 130° C. with stirring. The mixture is cooled to room temperature and the supernatant aqueous layer is decanted. The organic phase is washed by filling the vessel with water, stirring and decanting the aqueous layer and carrying out this cycle of operations a second time. The organic phase is finally separated.

The same results are obtained when the p-xylene is replaced by an equal weight of benzene.

EXAMPLE 3

A dyestuff dispersion, prepared as described in the following paragraph, is spread onto a drying plate and dried in a suction drying cabinet at from 50° to 75° C., the suction being produced by a filter pump. The temperature in the filter cake adjust itself to from 40° to 60° C. The naphthalene which sublimes may be recovered in a receiver cooled with ice and common salt. There is thus obtained a pigment having useful properties similar to those of the pigment obtained according to Example 1.

450 parts of an aqueous filter cake containing 30% of crude polychloro-copperphthalocyanine prepared according to Example 1 of German Pat. 1,059,595 by the chlorination of copperphthalocyanine in an aluminum chloride-common salt melt, are heated with 100-150 parts of naphthalene, 10 parts of 50% sodium hydroxide solution and 200 parts of water at 95° C. with stirring for 6 hours. The mixture is cooled to 70° C. until the naphthalene has solidified, and the solid mass is then subjected to vacuum, washed with warm water and pressed off. The filter cake contains from about 3 to 10% of water.

EXAMPLE 4

50 parts of copperphthalocyanine which has been milled in a vibratory mill containing steel shot for 24 hours to form a finely divided powder according to the method described in Example 1 of U.S. Pat. 2,857,400, are stirred with 100 parts of ethylene bromide and 50 parts of water for 6 hours at 40-60° C. The supernatant water is decanted and the residue is dried in vacuo at temperatures below 10° C.

There is thus obtained a pure pigment having high tinctorial strength in the form of a loose light powder.

EXAMPLE 5

50 parts of copperphthalocyanine, which has been milled in a vibratory mill as described in Example 4 above, 100 parts of $\beta,\beta,\beta$-trichloro-t-butyl alcohol, 200 parts of water and 1.2 parts of sodium hydroxide are stirred together at 100° C. for 6 hours. The mixture is suction filtered at 80° C. and washed with hot water having a temperature of from 60° to 80° C. The residue is then dried in vacuo at from 60° to 80° C. The loosely attached water resting on the surface of the filter cake evaporates from the liquid phase whilst the $\beta,\beta,\beta$-trichloro-t-butyl alcohol sublimes from the solid phase.

A loose pigment of high tinctorial strength is obtained which is similar to that produced in Example 4 above.

EXAMPLE 6

50 parts of dibromopyranthrone (C.I. Vat Orange 2) are stirred with a 10-20% solids aqueous filter cake are stirred with 100 parts of p-xylene for 6 hours at 100° C. The p-xylene is quantitatively absorbed by the dye, whilst the water separates as a clear liquid. The water is decanted and the residue is crystallized at temperatures below 10° C. and dried in vacuo. There is thus obtained an orange powder having good tinctorial strength and particle softness.

This sample, freeze-dried from organic phase, showed significantly better dispersibility than a comparative sample which had been formed in the same way but from which the p-xylene had been removed, after heating for 6 hours at 100° C., by passing through steam and which had been isolated by filtration, washing and drying of the aqueous filter cake.

EXAMPLE 7

250 parts of copperphthalocyanine are dissolved in 2,500 parts of 96% sulfuric acid, precipitated in 5000 parts of water at from 20° to 50° C., filtered off and washed until neutral. The resulting filter cake, which contains approximately 1,000 parts of water, is stirred for from 10 to 80 hours with 250 parts of cyclohexane at room temperature. The cyclohexane is taken up by the pigment and the water separates to an extent of from 90 to 95% and is decanted. The resulting flushed paste is crystallized at temperatures below +6° C. and dried at 20 mm. of Hg. There is obtained a particularly reddish pigment of the $\alpha$-1-modification, showing good tinctorial strength and ready dispersibility. A pigment showing equally good tinctorial strength and dispersibility is obtained when the cyclohexane is replaced by benzene or p-xylene.

Unlike the process described in German published application DAS 1,161,532, no surface active agents need be added to obtain a readily dispersible pigment.

I claim:

1. A process for isolating a finely divided water-insoluble organic dye from a dispersion of the dye in a liquid medium, which process comprises dispersing said dye in a liquid mixture consisting of water and a water-immiscible organic solvent capable of evaporating without decomposing and having a melting point between —20° C. and +120° C., the weight of organic solvent forming the organic phase of said mixture being at least 0.3 times the weight of dye whereas the weight of water forming the aqueous phase is not more than the weight of dye present in the mixture, solidifying at least the organic phase of said mixture by crystallization to form a solid mixture with said dye enveloped by the crystalline organic solvent, removing the aqueous phase present in the dispersion before or after crystallization of the solvent, and removing the solvent from the solid mixture by sublimation.

2. A process as claimed in claim 1, wherein the organic water-immiscible solvent is one having a melting point between 5° and 100° C. and a heat of vaporization of less than 200 kcal./kg.

3. A process as claimed in claim 1, wherein the weight of organic solvent used is from 0.3 to 10 times the weight of dye present.

4. A process as claimed in claim 1, wherein the organic solvent is removed from the solid mixture by sublimation under reduced pressure.

5. A process as claimed in claim 1, wherein said dye is a hydrophobic organic pigment.

6. A process as claimed in claim 1, wherein the dye used is selected from the group consisting of phthalocyanine dyes, chlorinated phthalocyanine dyes, chlorinated-cum-brominated phthalocyanine dyes, anthraquinone dyes, azo dyes, quinacridone dyes and perylene tetracarboxylic acid dyes.

7. A process as claimed in claim 1, wherein the dye is selected from the group consisting of phthalocyanine dyes, chlorinated phthalocyanine dyes, chlorinated-cum-brominated phthalocyanine dyes, anthraquinone dyes, quinacridone dyes, perylene tetracarboxylic acid dyes and azo dyes, and the organic water-immiscible solvent is selected from the group consisting of ethylene bromide, benzene, p-dichlorobenzene, p-xylene, naphthalene, cyclohexane, cyclohexanone and dimethyl succinate.

8. A process as claimed in claim 1, wherein the organic water-immiscible solvent is selected from the group consisting of ethylene bromide, benzene, xylene, naphthalene, p-dichlorobenzene, cyclohexanone and dimethyl succinate.

9. A process as claimed in claim 8, wherein the weight of organic solvent used is from 0.3 to 10 times the weight of dye present.

10. A process as claimed in claim 8, wherein the organic solvent is removed from the solid mixture by sublimation under reduced pressure.

References Cited

UNITED STATES PATENTS 3,159,498  12/1964  Davis _____ 34—5 X
3,119,706  1/1964   Bachmann _____ 106—308 Q X WILLIAM F. O'DEA, Primary Examiner W. C. ANDERSON, Assistant Examiner U.S. Cl. X.R.

34—5; 106—308 Q